(12) United States Patent
Jansson et al.

(10) Patent No.: US 6,260,346 B1
(45) Date of Patent: Jul. 17, 2001

(54) COMBUSTION PLANT AND A METHOD OF COMBUSTING A FUEL

(75) Inventors: Sven A Jansson; Ben Kyrklund; Mats Sjödin, all of Finspång (SE)

(73) Assignee: ABB Carbon AB, Finspang (SE)

( * ) Notice: Subject to any disclaimer, the term of this patent is extended or adjusted under 35 U.S.C. 154(b) by 0 days.

(21) Appl. No.: 09/319,114

(22) PCT Filed: Dec. 9, 1997

(86) PCT No.: PCT/SE97/02056

§ 371 Date: Jul. 21, 1999

§ 102(e) Date: Jul. 21, 1999

(87) PCT Pub. No.: WO98/26215

PCT Pub. Date: Jun. 18, 1998

(30) Foreign Application Priority Data

Dec. 13, 1996 (SE) .................................................... 9604594

(51) Int. Cl.⁷ .................................................... F02B 43/00
(52) U.S. Cl. ..................... 60/39.02; 60/39.12; 60/39.464
(58) Field of Search ............................... 60/39.02, 39.12, 60/39.464

(56) References Cited

U.S. PATENT DOCUMENTS

| | | | |
|---|---|---|---|
| 3,978,657 | * 9/1976 | Fulton et al. | 60/39.12 |
| 5,255,506 | * 10/1993 | Wilkes et al. | 60/39.12 |
| 5,469,698 | * 11/1995 | Garcia-Mallol | 60/39.02 |

FOREIGN PATENT DOCUMENTS

| | | |
|---|---|---|
| 0602795 | 6/1994 | (EP) . |
| 458955 | 5/1989 | (SE) . |
| 463776 | 1/1991 | (SE) . |
| 470222 | 12/1993 | (SE) . |

* cited by examiner

*Primary Examiner*—Timothy S. Thorpe
*Assistant Examiner*—Ehud Gartenberg
(74) *Attorney, Agent, or Firm*—Connolly Bove Lodge & Hutz

(57) ABSTRACT

A method of combusting a fuel, and a combustion plant are proposed. The combustion plant comprises a first circuit (1) with a gasifying reactor (3) to produce a combustible gas and a degassed, combustible rest product from the fuel. The combustible gas is supplied to a first combustion chamber (6) and there it is combusted while forming combustion gases. First means (8, 9) are arranged to take advantage of the energy in these gases. The plant further comprises a second circuit (2) with a second combustion chamber (15) which is supplied with the combustible rest product from the gasifying reactor (3). The rest product is combusted in the second combustion chamber (15) while forming combustion gases. The second circuit (2) further comprises second means (23, 24) for taking advantage of the energy of the combustion gases produced in the second circuit (2).

17 Claims, 2 Drawing Sheets

COMBUSTION PLANT AND A METHOD OF COMBUSTING A FUEL

THE BACKGROUND OF THE INVENTION AND PRIOR ART

The present invention relates to a combustion plant comprising a first circuit with a gasifying reactor which is arranged to produce a combustible gas and a degassed combustible rest product from a fuel, a first combustion chamber which is arranged to enable combustion of the combustible gas while forming combustion gases, and first means which are arranged to take advantage of energy produced in the first combustion chamber. The invention also relates to a method of combusting a fuel.

There are known combustion plants comprising a gasifying reactor in which a combustible gas is produced at substoichiometric combustion of a fuel. Such plants are employed for relatively delicate fuels, such as for example coal or waste. The combustible gas is supplied to a combustion chamber in which the gas is combusted while forming hot combustion gases which are employed to drive a gas turbine. Furthermore, such plants normally comprise an exhaust gas boiler with a steam generator and a steam cycle with a steam turbine for taking advantage of the energy in the combustion gases leaving the gas turbine. In order to obtain a high efficiency or level of employment of the fuel it is important to drive the gasifying of the fuel as far as possible. Thereby, a complication is that the rest product obtained by the gasifying consists of a liquid glass-like slag with a temperature of approximately 1000° C. Another complication is that, if the gasifying is driven too far, not only volatile and non-problematic gases such as $H_2$, $CO$, $CO_2$ and $H_2O$ are obtained in the combustible gas, but also more complicated and hard treated agents such as hydrogen sulphuric compounds. This requires an extensive purifying of the combustible gas produced from particles on one hand, and from $H_2S$ and other mercaptans on the other hand. This purifying normally takes place in several stages, where the first stage comprises a heat exchanger by means of which the gas temperature is decreased. The following stage normally implies that solid particles are removed by means of cyclones and/or ceramic filters and the subsequent stages comprise the purifying from sulphuric compounds by means of conventional wet chemical methods. This makes such a plant very extensive, space-demanding and makes the investment cost per effect unit become high. Furthermore, the important complexity implies that the reliability and applicability of the plant is unsatisfactory at a lot of occasions. Furthermore, the efficiency of such a plant becomes restricted due to the energy demanding measures required for different purifying stages, the oxygen gas needed for the gasifying and due to the rest product obtained still having a certain energy content. Accordingly it is possible to reach a total efficiency in the order of 44% by such a plant.

It is also known to combust such delicate fuels in a pressurized, fluidized bed, a so called PFBC-plant (pressurized fluidized bed combustion). The fuel is combusted in a bed of particulate, non-combustible material which is supplied with combustion air from below through nozzles in such a way that the bed becomes fluidized. The combustion gases formed by the combustion process pass a freeboard above the bed, whereinafter they are purified with reference to particles and are conducted to a gas turbine. The combustion gases drive the gas turbine, which in its turn drives an electric generator on one hand and a compressor providing the pressure vessel with compressed air on the other hand. In the fluidized bed the set of tubes of a steam boiler with a steam generator and super heating tubes is immersed. The steam boiler is connected to a steam circuit which comprises a steam turbine for taking advantage of the produced heat. In the bed the fuel is combusted at a temperature in the order of 850° C. The total nominal efficiency of the plant is in the order of 44%.

It is also known to combust such delicate fuel in a pressurized, circulating bed, a so called PCFB-plant (pressurized circulating fluidized bed). The fuel is combusted in a bed of particulate, non-combustible material supplied with combustion air from below through nozzles in such a way that the bed becomes fluidized and a significant part of the bed material is transported pneumatically through the set of tubes to a steam boiler with a steam generator and superheating tubes. The steam boiler is connected to a steam circuit comprising a steam turbine for taking advantage of the heat produced. The combustion gases formed by the combustion process, and a significant part of the bed material pass the set of tubes above the bed, whereafter, in a plurality of purifying stages, they are purified from particles, and the combustion gas is conducted to a gas turbine. The combustion gases drive the gas turbine which, in its turn, drives an electric generator on one hand and a compressor which provides the pressure vessel with compressed air on the other hand. In the bed the fuel is combusted at a temperature in the order of 850° C. The total nominal efficiency of the plant is in the order of 44%.

To be able to maintain the temperature up to the first turbine stage of the gas turbine at a required level it is known through SE-B-470 222 to arrange an additional combustion in the freeboard above the bed by injecting a supplementary fuel. In that way, at partial load operation, it is possible to adjust the temperature of the combustion gases to an optimum operation temperature for the subsequent gas turbine. Such a freeboard combustion goes very well with an addition of such complementary fuels as volatile oils or gases. However, it is a disadvantage to need to employ several different types of fuels for one and the same plant, as this complicates the handling and the operation of the plant.

A problem which has burdened the PFBC- as well as PCFB-technique and obstructed the obtaining of a very high efficiency is that the upper temperature limit at which a combustion of for instance coal in a fluidized bed takes place normally is approximately 850° to 950° C. depending on the coal quality. This implies that the driving gas for the gas turbine comprised in the PFBC- or PCFB-power plant has a temperature approximately equal to the temperature in the fluidized bed. Because the efficiency of the gas turbine cycle increases along with increased temperature of the driving gas, it is desirable to have a higher gas temperature, up to 1200–1450° C., to make the efficiency of the gas turbine cycle of the plant reach an optimum level. To remedy this weakness, it has been proposed to increase the temperature of the gases leaving the PFBC-combustion chamber or the PCFB-combustion chamber by means of a topping combustion chamber in which a fuel is combusted. As the driving gases pass the topping combustion chamber the temperature can be increased before they are supplied to the gas turbine. Such a technique is known through SE-B-458 955. In this document it is further described how fuel to the topping combustion chamber is accomplished by means of a gasifying reactor, in which coal at substoichiometric conditions is gasified while producing a combustible gas which is supplied to the topping combustion chamber. The gasifying reactor shown forms an integrated part of a PFBC-combustion chamber and is thus located inside the pressure vessel that encloses the PFBC-combustion chamber. The combustible gases produced in the gasifying reactor are conducted to a topping combustion chamber located outside the pressure vessel, where they are mixed with the combustion gases from the combustion chamber and are combusted to increase the temperature of the combustion gases to the optimum level before they are conducted to the gas turbine. However, as the combustion gases leaving the combustion chamber contain a significant amount of particles of ash, this high temperature obtained in the topping combustion chamber will result in a melting of ash, causing substantial problems in the gas turbine. To make such a combustion possible, the combustion gases from the fluidized bed must thus be purified from particles by means of not yet conventional purifying methods like hot gas filters, before the increase of temperature to such an optimum gas turbine temperature may take place. However, hot gas filters are expensive and have an unsatisfactory reliability.

SUMMARY OF THE INVENTION

An object of the present invention is to remedy the above problems and accomplish a combustion plant with an improved total efficiency, that is to make it possible to take advantage of a very significant part of the energy value of a fuel in a simple way and a favorable way as to costs. Furthermore, an object is to keep the investment cost per effect unit at a commercially acceptable level.

The above objects are obtained by the combustion plant initially defined, which is characterized in that it comprises a second circuit with a second combustion chamber which is arranged to enable a combustion while forming combustion gases, and second means which are arranged to take advantage of the energy produced through the combustion in the second combustion chamber, and a connection which is arranged between the gasifying reactor and the second combustion chamber and which is arranged to enable feeding of the combustible rest product from the gasifying reactor into the second combustion chamber in order to combust the rest product in the second combustion chamber. By arranging two generally separate combustion circuits in this way, a basis for an optimization of the plant to improve the total efficiency in comparison to the total efficiency for each of the two combustion circuits separately is created. It should be possible to reach a total efficiency in the order of 50% with a combustion plant according to the invention. This improvement is thus obtained by gasifying a volatile unproblematic part of the fuel and combusting it in its own combustion chamber which thus can be optimized in order to reach high temperatures, and that a part of the fuel that is more difficult to handle is combusted in another combustion chamber which then can be optimized for the conditions determined by the difficult fuel. Because the rest product obtained by the gasifying can take advantage of combustion in the second combustion chamber, the gasifying does not need to be driven to such an extent, but only until the most volatile gases depart. In that way, a clean and manageable combustible gas which only requires purifying from particles and possible sulphur is obtained. Accordingly, the very extensive oxygen gas plant and equipment to take care of the liquid slag needed in traditional gasifying plants may be dispensed with, and the wet chemical equipment for sulphur purification can probably be reduced or simplified. Accordingly, a significant reduction of the investment cost is obtained.

According to one embodiment of a invention, the first circuit comprises a combustion gas channel which is arranged to conduct the combustion gases from the first combustion chamber to the atmosphere, and the second circuit comprises a combustion gas channel which is separated from the combustion gas channel of the first circuit and arranged to conduct the combustion gases from the second combustion chamber to the atmosphere.

According to another embodiment of the invention the second combustion chamber comprises a fluidized bed in which the combustion is to take place. Such a fluidized bed, which may be of a bubbling or circulating type, is well suited for the combustion of fuels which are difficult to handle, as undesirable components produced by the combustion can be absorbed already in the bed by means of an absorbent supplied to the bed, for instance calcareous material, such as dolomite, or limestone for the absorption of sulphur.

Preferably, the fluidized bed is pressurized. Thereby, the second means may comprise a second gas turbine which is arranged to be driven by the combustion gases formed by the combustion in the second combustion chamber. Such a gas turbine may then be adjusted to the combustion gas temperature obtained in a pressurized, fluidized bed. Moreover, the second circuit member may comprise an inlet conduit with a compressor driven by the second gas turbine and arranged to supply the second combustion chamber with pressurized gas containing oxygen through the inlet conduit.

According to another embodiment of the invention, a gas conduit is arranged to enable a supply of combustible gas from the gasifying reactor to a burner member which is arranged to enable a control of the temperature of the combusting gases produced in the second circuit. In that way it is possible to maintain the temperature of the combustion gases generated in the fluidized bed required for the cycle, and simultaneously control the combustion in the bed in a way optimal for the bed. Advantageously, a first valve member is thereby arranged to control the supply of combustible gas from the gasifying reactor to the burner member.

According to another embodiment of the invention, the first means comprise a gas turbine which is arranged to be driven by the combustion gases produced in the combustion chamber of the first circuit. Such a gas turbine may be arranged to operate at high temperatures in the order of 1200–1450° C. in order to enable high efficiency for the gas turbine cycle. Thereby at least one generator may be arranged to be driven by at least one of the first and the second gas turbine. Accordingly, each one of the two gas turbines may drive a respective generator or drive a generator common for the two of them.

According to another embodiment of the invention, the first circuit comprises an inlet conduit with a compressor driven by the first gas turbine and arranged to supply the first combustion chamber with pressurized gas containing oxygen through the inlet conduit. Moreover, the first circuit may comprise another inlet conduit with a compressor which is arranged to supply the gasifying reactor with pressurized gas containing oxygen, and the further inlet conduit is connectable with one of the inlet conduit of the first circuit and the inlet conduit of the second circuit. Even if the combustion chamber and the gas turbine of the first circuit is at rest, the gasifying reactor of the first circuit will accordingly continue to operate in order to produce combustible gas for the additional combustion in the combustion chamber of the second circuit.

The above objects are also obtained by the method initially defined which comprises the steps of producing a combustible gas and a degassed combustible rest product from the fuel, supplying a first combustion chamber with the combustible gas, combusting the combustible gas in the first combustion chamber while producing combustion gases, driving a first gas turbine with said combustion gases, supply a second combustion chamber with the combustible rest product from the gasifying reactor, combusting the rest product in the second combustion chamber while producing combustion gases, and driving a second gas turbine with said combustion gases from the second combustion chamber.

BRIEF DESCRIPTION OF THE DRAWINGS

The invention will now be described in detail by means of different embodiments given by way of example and one of which is presented on the annexed drawings.

DETAILED DESCRIPTION OF DIFFERENT EMBODIMENTS

Figure 1:
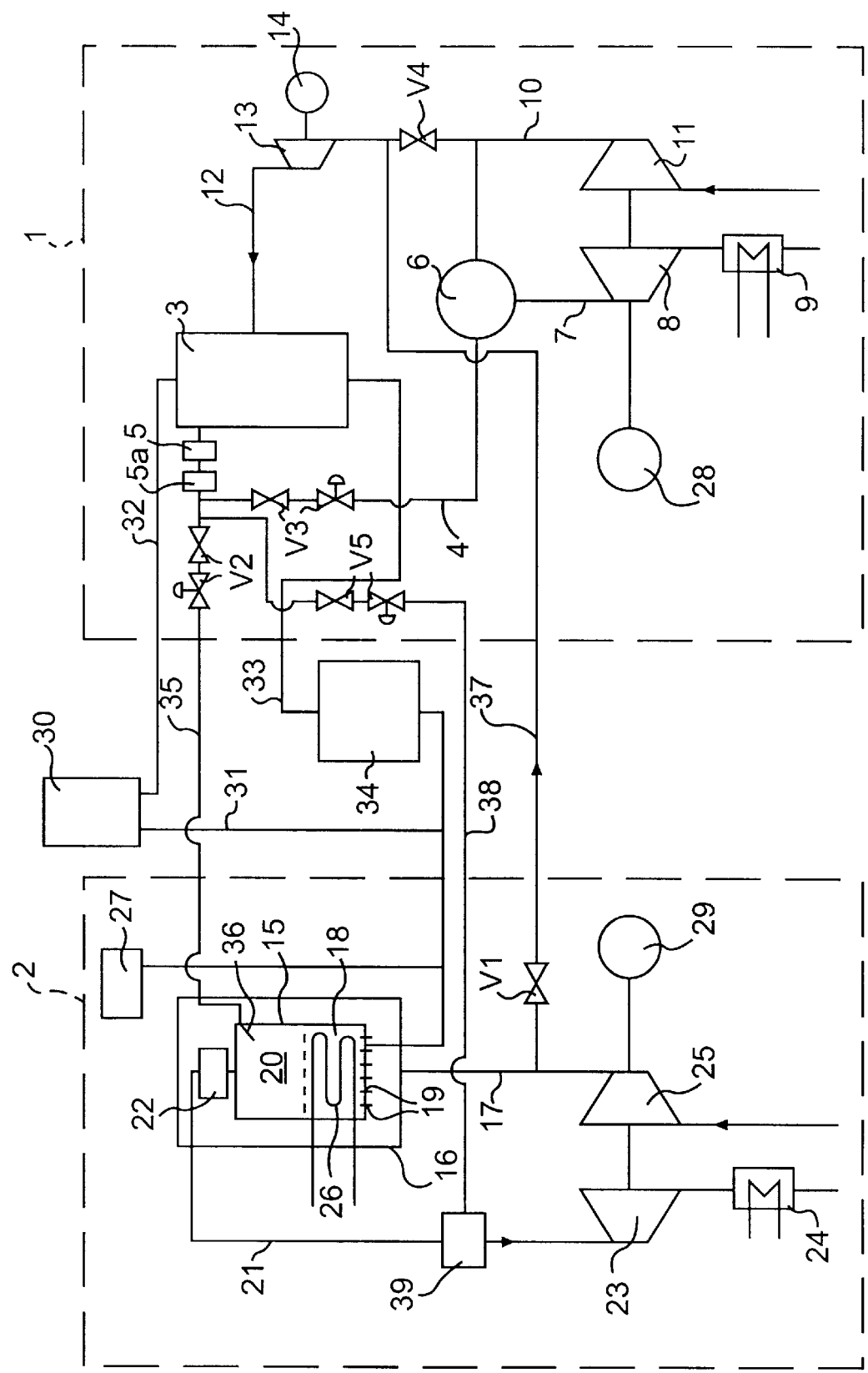
FIG. 1 schematically shows a combustion plant with two combustion circuits according to a first embodiment of the invention.

The combustion plant shown in FIG. 1 comprises a first combustion circuit 1 and a second combustion circuit 2. The first circuit 1 comprises a gasifying reactor 3 which is arranged to produce a combustible gas and a degassed combustible rest product from a fuel. The combustible gas is conducted through a gas conduit 4 to a heat exchanger 5 arranged to cool the combustible gas. The heat exchanger 5 may be connected to a steam circuit for generating or superheating steam for a steam turbine not shown. From the heat exchanger 5 the cooled combustible gas is conducted via a purifying equipment 5a, for instance in the shape of a filter, to a first combustion chamber 6. The first combustion chamber 6 is arranged to combust the combustible gas while producing hot combustion gases, and these gases are conducted through a combustion gas channel 7 from the first combustion chamber 6 to the atmosphere. The combustion gas channel 7 comprises first means for extracting energy from the combustion gases, the means, in the example shown, comprising a gas turbine 8 and a heat exchanger 9 arranged subsequently to the gas turbine 8, the heat exchanger for instance comprising a so called economizer or Heat Recovery Steam Generator and being connected to a steam circuit that comprises a steam turbine, not shown. The gas turbine 8 shown may comprise one or more turbine steps. Moreover, the first circuit 1 comprises an inlet conduit 10 which comprises a first compressor 11 driven by the gas turbine 8 and arranged to compress the combustion air required for the combustion in the combustion chamber 6 and the gasifying reactor 3. The first circuit 1 further comprises a further inlet conduit 12 which extends from the inlet conduit 10 to the gasifying reactor 3 and which comprises a second compressor 13 which compresses the combustion air necessary for the gasifying. The second compressor 13 is a so called booster compressor that can be driven by means of, for example, an electric motor 14 or a steam turbine obtaining steam from the plant.

The second circuit 2 comprises a combustion chamber 15 which is housed in a pressure vessel 16 which can be pressurized up to for example between 7 and 30 bar. Through an inlet conduit 17 the pressure vessel 16 is supplied with compressed combustion air for pressurizing the combustion chamber 15 and for fluidizing a bed 18 in the combustion chamber 15. The compressed combustion air is supplied to the combustion chamber 15 via fluidizing nozzles 19 that are schematically shown and arranged in a bottom plate of the combustion chamber 15. The bed 18 is of a bubbling or circulating type and comprises a non-combustible particulate bed material, a particulate absorbent and a particulate fuel. The bed material comprises for example sand and the absorbent comprises a calcareous material, for example dolomite or limestone for the absorption of sulphur released by the combustion. The fuel is supplied in such an amount that it constitutes approximately 1% of the bed 18. The fuel is combusted in the fluidizing air supplied to the bed 18 while producing hot combustion gases. These gases are gathered in a space located above the bed 18, a so called freeboard 20, and are then conducted via a combustion gas channel 21 to the atmosphere. The combustion gas channel 21 comprises a purifying plant 22 schematically shown which may comprise a number of cyclones, a gas turbine 23 and a heat exchanger 24 arranged subsequently to the gas turbine 23 and, for example, comprising an economizer or Heat Recovery Steam Generator and being connected to a steam circuit which comprises a steam turbine, not shown. It is noted that the gas turbine 23 may comprise one or more turbine steps, for example, constituted by a high pressure turbine and a low pressure turbine. The gas turbine 23 is arranged to drive a compressor 25 which, via the inlet conduit 17, delivers the compressed combustion air to the combustion chamber 15. Moreover, the second circuit 2 comprises a steam circuit 26 which is shown with a set of tubes which is immersed in the fluidized bed 18 and in which water is circulated, steamed and superheated through heat exchange between the tubes and the bed material for absorption of heat produced by the combustion executed in the bed 18. Furthermore, the second circuit 2 comprises an introducing member 27, schematically shown, for feeding the absorbent into the combustion chamber 15.

The first gas turbine 8 drives a first generator 28 for producing electric energy and the second gas turbine drives a second generator 29. It is noted that the two generators 28, 29 may be replaced by one single generator, a releasing possibility having to be arranged at each generator shaft in order to make it possible to drive the only generator by the gas turbine being in operation.

The combustion plant according to the invention further comprises a fuel source 30 schematically shown, from which fuel can be introduced. The source 30 is connected to a supply conduit 31 which is arranged to enable feeding of a fuel into the combustion chamber 15 of the second circuit 2 and a supply conduit 32 which is arranged to enable feeding of a fuel into the gasifying reactor 3 of the first circuit 1. Fuel refers to as a combustible product such as, for example, stone coal, brown coal, peat, biofuel, oil shale, pet coke, waste, oils etc. In the example shown, the same fuel is supplied to both combustion circuits 1 and 2. However, it is also possible to drive the two circuits 1, 2 with different fuels and to supply the circuits 1, 2 with fuel from different sources.

The combustion plant according to the present invention further comprises a connection in the shape of a channel member 33 which is arranged between the gasifying reactor 3 and the second combustion chamber 15 and which is arranged to enable feeding of the combustible rest product obtained by the gasifying in the reactor 3 into the second combustion chamber 15 for a combustion of the rest product. When the plant is fed with coal, coke (char coal) is obtained as the rest product. The channel member 33 shown comprises a storing member 34 which enables an intermediate storage of the combustible rest product. In that way, the gasifying reactor 3 may be driven and deliver a combustible rest product without depending on the operational condition of the second combustion chamber 15, and the second combustion chamber 15 may be fed with the rest product without depending on whether the gasifying reactor 3 is in operation or not. Suitably, the second combustion chamber 15 is fed with combustible rest product via the channel member 33 as well as with fuel from the source 30 via the supply conduit 31. However, it is possible under certain operational conditions, to feed the second combustion chamber 15 with fuel only from the fuel source 30 or with only the combustible rest product from the gasifying reactor 3.

The combustion plant further comprises a gas conduit 35 which, via the heat exchanger 5 and the purifying equipment 5*a*, extends from the gasifying reactor 3 to a burner member 36 which, in the example shown, is arranged such that it opens into the freeboard 20 of the second combustion chamber 15. The gas circuit 35 is thus arranged to enable a supply of combustible gas from the gasifying reactor 3 to the burner member 36 for a combustion of the combustible gas in the freeboard 20. In that way the temperature of the combustion gases produced in the second combustion chamber 15 may be controlled and maintained at a required level also at partial load operation of the combustion chamber 15. The combustion plant may also comprise a gas conduit 38 which, via the heat exchanger 5 and the purifying equipment 5*a*, extends from the gasifying reactor 3 to a topping combustion chamber 39 which is arranged downstream of the purifying plant 22, which in this case comprises a hot gas filter which enables an effective removal of ash particles from the combustion gases. By such a topping combustion chamber 39 it is thus possible to increase the temperature of the combustion gases conducted to the gas turbine 23 to a level above the melting temperature of the ash. The gas conduit 35 with the burner member 36 and the gas conduit 38 with the topping combustion chamber 39 thus constitute alternative ways of accomplishing an increase of temperature at the combustion gas side of the second circuit 2 that however do not exclude each other.

To enable different operation alternatives for the combustion plant according to the invention, the plant comprises a number of valve members, v1, v2, v3, v4 and v5. The valve member v1 which comprises a closing valve is arranged at a connection conduit 37 which extends between the inlet conduit 17 of the second circuit 2 and the further inlet conduit 12 of the first circuit 1. When the valve member v1 is opened, combustion air may accordingly be supplied to the booster compressor 13 and the gasifying compressor 3 by means of the compressor 25 of the second circuit 2. The valve member v2 comprises a closing valve and a control valve and is arranged at the gas conduit 35, the valve member v5 comprises a closing valve and a control valve and is arranged at the gas conduit 38, and the valve member v3 comprises a closing valve and a control valve and is arranged on the gas conduit 4. By means of the valve members v2 and v5 and v3, respectively, the supply of combustible gas to the combustion member 36 and the topping combustion chamber 38 and the combustion chamber 6 respectively, may be controlled. The valve member v4, which comprises a closing valve, is arranged on the inlet conduit 10 of the first circuit 1 in order to open or shut the flow of compressed combustion air from the compressor 11 of the first circuit 1 to the booster compressor 13.

If the two combustion circuits 1 and 2 are simultaneously operated, the valve members v2 and/or v5 and v3 and v4 are thus open while the valve member v1 is closed. If only the first circuit 1 is in operation, the valve members v3 and v4 are opened while the valve members v1, v2 and v5 are closed. If only the second circuit 2 is in operation, the valve members v1 and v2 and/or v5 may be open while the valve members v3 and v4 are closed, and in that way the first circuit 1 may be employed for the production of combustible gas for a freeboard combustion in the second combustion chamber 15 and/or a combustion in the topping combustion chamber 39, even if the combustion chamber 6 is not in operation.

Figure 2:
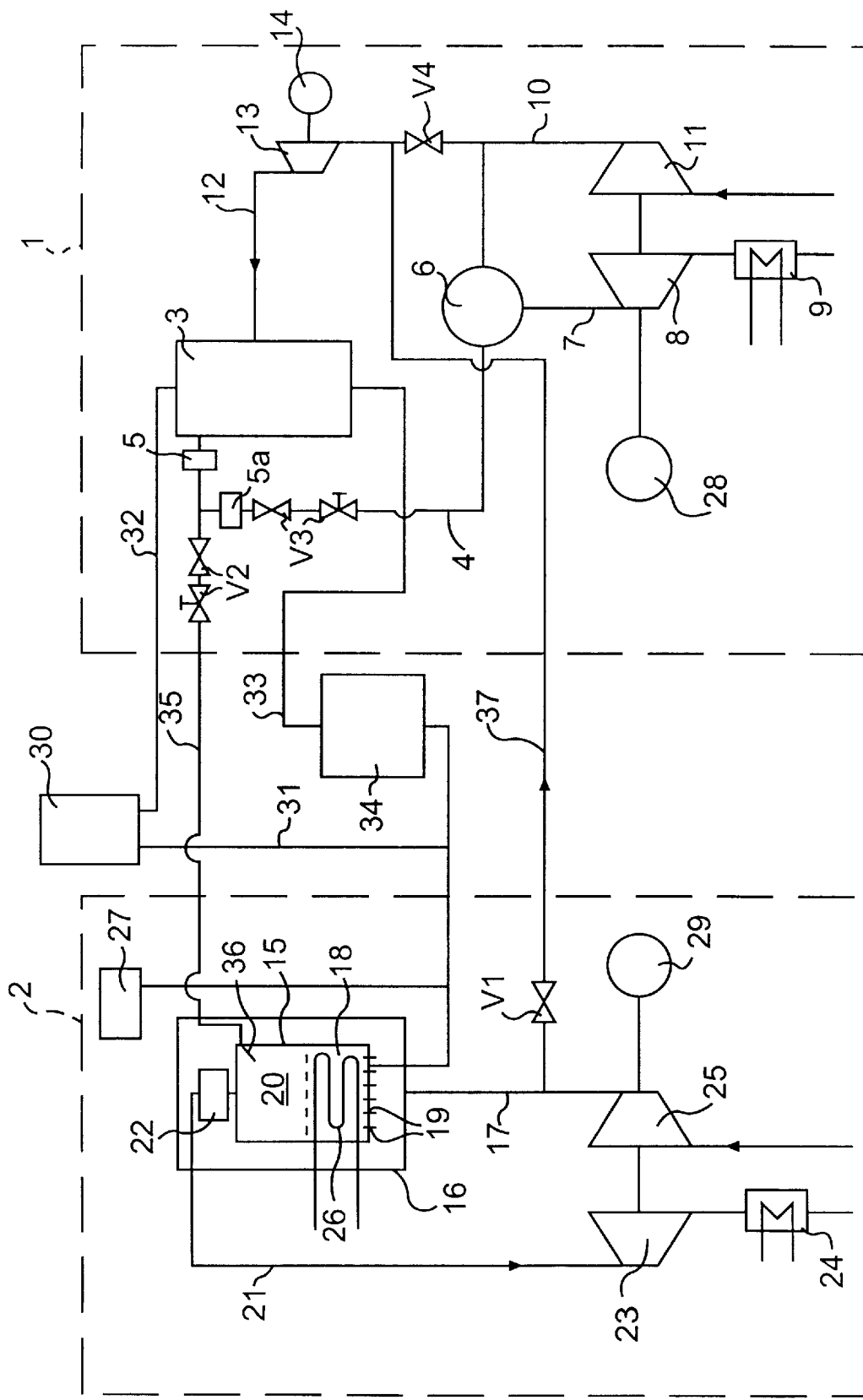
FIG. 2 schematically shows a combustion plant with two combustion circuits according to a second embodiment of the invention.

The combustion plant shown in FIG. 2 differs from the one in FIG. 1 as the purifying equipment 5*a*, for example in the shape of a filter, is arranged on the gas conduit 4 and, thus, is only arranged to purify the combustible gas supplied to the first combustion chamber 6. In many applications it is not necessary to purify the combustible gas supplied to the second combustion chamber 15 comprising a fluidized bed. This alternative should exclude an increase of temperature to above the melt temperature of the ash, and, accordingly, the topping combustion chamber 39 and the gas conduit 38 would be redundant in the second embodiment. Here it should be noted that the combustible gas, by means of the heat exchanger 5, obtains a temperature suitable for a purifying filter. It may also be advantageous with a cooling of the combustible gas before it is conducted to the valve members v2 and v3, making it possible to manufacture the latters in conventional materials.

It should be noted that the heat exchangers 5, 9, 24, 26, schematically shown, may constitute one part each of a steam circuit which is common for the plant and comprises a steam turbine for driving an electric generator. The heat exchangers 5, 9, 24, 26 shown may, however, also be driven as separated from each other, for example, in co-operation with a respective steam turbine or in combinations where, for example, the heat exchanger 9 constitutes a part of a steam circuit which comprises a steam turbine with an electric generator, and the heat exchangers 24 and 26 constitute a part of another steam circuit which comprises another steam turbine with an electric generator.

The present invention is not in any way limited to the above embodiments but may be varied and modified within the frame of the following patent claims.

Even though the invention has been illustrated hereinbefore in connection to a PFBC-plant, it is obvious that it also may be realized with a PCFB-plant. In this case, the combustion chamber 15 comprises means for a circulation of bed material, for example in the shape of a cyclone and a refeeding channel.

What is claimed is:

1. A combustion plant comprising a first circuit (1) with a gasifying reactor (3) which is arranged to produce a combustible gas and a degassed combustible rest product from a fuel, a first combustion chamber (6) which is arranged to enable combustion of the combustible gas while forming combustion gases, and first means (8, 9) arranged to take advantage of the energy produced through the combustion in the first combustion chamber (6), and a second circuit (2) with a second combustion chamber (15) which is arranged to enable a combustion while forming combustion gases and with second means (23, 24) which are arranged to take advantage of the energy produced through the combustion in the second combustion chamber (15), wherein the plant comprises a connection (33) which is arranged between the gasifying reactor (3) and the second combustion chamber (15) and which is arranged to enable feeding of the combustible rest product from the gasifying reactor (3) into the second combustion chamber (15) for a combustion of the rest product in the second combustion chamber, characterized in that the second combustion chamber (15) comprises a pressurized fluidized bed (18) in which the combustion is to take place, and that said second means comprise a second gas turbine (23) which is arranged to be driven by the combustion gases formed by the combustion in the second combustion chamber (15); and further characterized by a gas conduit (35, 38) which is arranged to enable a supply of combustible gas from the gasifying reactor (3) to a burner member (36, 39) which is arranged to enable a control of the temperature of the combustion gases produced in the second circuit (2).

2. A combustion plant according to claim 1, characterized in that the first circuit (1) comprises a combustion gas channel (7) which is arranged to conduct the combustion gases from the first combustion chamber (6) to the atmosphere, and that the second circuit (2) comprises a second combustion gas channel (21) which is separated from the combustion gas channel (7) of the first circuit (1) and is arranged to conduct the combustion gases from the second combustion chamber (15) to the atmosphere.

3. A combustion plant according to claim 3, characterized in that the fluidized bed comprises one of a circulating bed and a bubbling bed.

4. A combustion plant according to claim 1, characterized in that the second circuit (2) comprises an inlet conduit (17) with a compressor (25) driven by the second gas turbine (23) and arranged to supply the second combustion chamber (15) with pressurized gas containing oxygen through said inlet conduit (17).

5. A combustion plant according to claim 1, characterized by a first valve member (v2, v5) arranged to control the supply of combustible gas from the gasifying reactor (3) to said burner member (36, 39).

6. A combustion plant according claim 1, characterized in that the first means comprise a gas turbine (8) which is arranged to be driven by the combustion gases produced in the combustion chamber (6) of the first circuit (1).

7. A combustion plant according to claim 6, characterized by at least one generator (28, 29) which is arranged to be driven by at least one of the first and the second gas turbine (8, 23).

8. A combustion plant according to claim 7, characterized in that the first circuit (1) comprises an inlet conduit (10) with a compressor (11) driven by the first gas turbine (8) and arranged to supply the first combustion chamber (6) with pressurized gas containing oxygen through said inlet conduit (10).

9. A combustion plant according to claim 8, characterized in that the first circuit comprises one further inlet conduit (12) with a compressor (13) which is arranged to supply the gasifying reactor (3) with pressurized gas containing oxygen, and that said further inlet conduit (12) is connectable to one of the inlet conduit (10) of the first circuit (1) and the inlet conduit (17) of the second circuit (2).

10. A combustion plant according to claim 9, characterized by second valve members (v1, v4) arranged to control the supply of gas containing oxygen to the gasifying reactor from one of the inlet conduit (10) of the first circuit (1) and the inlet conduit (17) of the second circuit (2).

11. A combustion plant according to claim 1, characterized by a third valve member (v3), arranged to control the supply of combustible gas from the gasifying reactor (3) to the first combustion chamber (6).

12. A combustion plant according to claim 6, characterized in that the first and the third valve members (v2, v5, v3) are arranged to enable a control of the supply of combustible gas to one of the gasifying reactor (3) and said burner member (36; 39).

13. A combustion plant according to claim 1, characterized by a purifying equipment (5a), arranged to purify at least a part of the combustible gas produced in the gasifying reactor (3), and a heat exchanger (5), arranged to cool the combustible gas produced in the gasifying reactor (3) before said gas is supplied to the purifying equipment (5a).

14. A combustion plant according to claim 16, characterized in that the heat exchanger (5) is arranged to transfer heat energy from the combustible gas to a steam circuit for a production and/or superheating of steam for a steam turbine.

15. A method of combusting a fuel, comprising the steps of producing a combustible gas and a degassed combustible rest product from the fuel, supplying a first combustion chamber with the combustible gas, combusting the combustible gas in the first combustion chamber, while forming combustion gases, driving a first gas turbine with said combustion gases, supplying a second combustion chamber with the combustible rest product from the gasifying reactor, combusting the rest product in the second combustion chamber while forming combustion gases, supplying at least a part of the combustible gas to a burner member and combusting said at least part for the control of the temperature of combustion gases leaving the second combustion chamber, and driving a second gas turbine with said combustion gases from the second combustion chamber.

16. A method according to claim 15, characterized in that the combustion gases from the first combustion chamber are conducted therefrom to the atmosphere without being mixed with the combustion gases from the second combustion chamber.

17. A method according to claim 16, characterized in that the second combustion chamber comprises a fluidized bed, and that the bed is supplied with pressurized gas containing oxygen from a compressor driven by the second gas turbine.

* * * * *